(12) United States Patent
Major et al.

(10) Patent No.: US 9,964,032 B2
(45) Date of Patent: May 8, 2018

(54) FAN DRIVE GEAR SYSTEM MODULE AND INLET GUIDE VANE COUPLING MECHANISM

(71) Applicant: United Technologies Corporation, Hartford, CT (US)

(72) Inventors: Daniel W. Major, Middletown, CT (US); Gregory E. Reinhardt, South Glastonbury, CT (US); Paul Thomas Rembish, East Hampton, CT (US); Barry William Spaulding, Middletown, CT (US); Donald Summers, Northford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 360 days.

(21) Appl. No.: 14/429,071

(22) PCT Filed: Sep. 12, 2013

(86) PCT No.: PCT/US2013/059506
§ 371 (c)(1),
(2) Date: Mar. 18, 2015

(87) PCT Pub. No.: WO2014/046965
PCT Pub. Date: Mar. 27, 2014

(65) Prior Publication Data
US 2015/0226116 A1      Aug. 13, 2015

Related U.S. Application Data

(60) Provisional application No. 61/789,207, filed on Mar. 15, 2013, provisional application No. 61/703,489, filed on Sep. 20, 2012.

(51) Int. Cl.
F02C 3/073       (2006.01)
F02C 7/20        (2006.01)
(Continued)

(52) U.S. Cl.
CPC ............ F02C 3/073 (2013.01); F01D 17/162 (2013.01); F01D 25/243 (2013.01); F02C 7/20 (2013.01);
(Continued)

(58) Field of Classification Search
CPC .... F01D 25/243; F01D 25/246; F01D 17/162; F05D 2230/60; F05D 2230/70;
(Continued)

(56) References Cited

U.S. PATENT DOCUMENTS 3,727,660 A * 4/1973 Burge .................. F04D 29/542
                                                        411/337
4,704,862 A   11/1987 Dennison et al.
(Continued)

FOREIGN PATENT DOCUMENTS

EP      1277919      1/2003
EP      1757776      2/2007
(Continued)

OTHER PUBLICATIONS

Extended European Search Report for EP Application No. 13838108.2 dated Oct. 29, 2015.
(Continued)

*Primary Examiner* — Woody Lee, Jr.
*Assistant Examiner* — Elton Wong
(74) *Attorney, Agent, or Firm* — Carlson, Gaskey & Olds, P.C.

(57) ABSTRACT

A connection assembly for securing a fan drive gear system module within a gas turbine engine includes first and second
(Continued)

members removably secured to one another by radially extending fasteners.

13 Claims, 7 Drawing Sheets

(51) Int. Cl.
    *F02C 7/36*     (2006.01)
    *F01D 25/24*     (2006.01)
    *F01D 17/16*     (2006.01)

(52) U.S. Cl.
    CPC ............ *F02C 7/36* (2013.01); *F05D 2220/36* (2013.01); *F05D 2230/60* (2013.01); *F05D 2230/70* (2013.01); *F05D 2260/31* (2013.01); *F05D 2260/40311* (2013.01); *F05D 2260/79* (2013.01); *Y10T 29/49233* (2015.01)

(58) Field of Classification Search
    CPC .. B64D 27/26; B64D 2027/262; B64D 29/06; B64D 29/08; Y10T 29/49233; B64F 5/40; B64F 5/0081
    See application file for complete search history.

(56) References Cited

U.S. PATENT DOCUMENTS

| | | | |
|---|---|---|---|
| 4,740,098 A * | 4/1988 | Witt | E06B 3/984 403/205 |
| 6,634,863 B1 * | 10/2003 | Forrester | F01D 5/06 416/193 A |
| 7,716,914 B2 | 5/2010 | Schilling | |
| 7,950,220 B2 * | 5/2011 | Merry | F02C 3/067 415/65 |
| 8,205,432 B2 | 6/2012 | Sheridan | |
| 8,235,655 B1 | 8/2012 | Pankey et al. | |
| 8,276,362 B2 | 10/2012 | Suciu et al. | |
| 8,328,512 B2 | 12/2012 | Major et al. | |
| 8,500,394 B2 | 8/2013 | Major et al. | |
| 8,888,418 B2 | 11/2014 | Costa et al. | |
| 2003/0113204 A1 | 6/2003 | Wolf | |
| 2005/0231052 A1 * | 10/2005 | Rockarts | F01D 5/027 310/90 |
| 2007/0020090 A1 | 1/2007 | Glaimo et al. | |
| 2008/0219832 A1 | 9/2008 | Major et al. | |
| 2009/0081039 A1 * | 3/2009 | McCune | F02C 7/04 415/214.1 |
| 2009/0208338 A1 | 8/2009 | Major et al. | |
| 2010/0310358 A1 * | 12/2010 | Major | F01D 17/162 415/159 |
| 2012/0251297 A1 | 10/2012 | Major et al. | |
| 2012/0257963 A1 | 10/2012 | Major et al. | |

FOREIGN PATENT DOCUMENTS

| | | |
|---|---|---|
| EP | 1870579 | 12/2007 |
| EP | 2075439 | 7/2009 |
| GB | 1387866 | 3/1975 |
| JP | 2005315138 | 11/2005 |
| WO | 2005100941 | 10/2005 |

OTHER PUBLICATIONS

International Preliminary Report on Patentability for International Application No. PCT/US2013/059506 dated Apr. 2, 2015.
International Search Report and Written Opinion for PCT/US2013/059506 dated Dec. 5, 2013.

* cited by examiner

FIG.8

FAN DRIVE GEAR SYSTEM MODULE AND INLET GUIDE VANE COUPLING MECHANISM

This application is a United States National Phase of PCT Application No. PCT/US2013/059506 filed on Sep. 12, 2013 which claims priority to U.S. Provisional Application No. 61/703,489, filed on 20 Sep. 2012 and U.S. Provisional Application No. 61/789,207, filed on 15 Mar. 2013.

BACKGROUND

This disclosure relates to a coupling mechanism for removably securing a fan drive gear system module from the rest of the gas turbine engine.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction. One type of gas turbine engine uses a geared architecture between the turbine section and the fan section, which reduces the rotational speed of the fan section.

Turbine engine manufacturers, including those of geared gas turbine engines, continue to seek further improvements to engine performance and assembly including improvements to manufacture, maintainability, thermal, transfer, and propulsive efficiencies.

SUMMARY

In one exemplary embodiment, a connection assembly for securing a fan drive gear system module within a gas turbine engine includes first and second members removably secured to one another by radially extending fasteners.

In a further embodiment of the above, the fasteners are accessible through a flow path of the gas turbine engine.

In a further embodiment of any of the above, the fasteners are captured within the fan drive gear system module to prevent the fasteners from entering the flow path.

In a further embodiment of any of the above, the first members are connected to an on-wing portion of the gas turbine engine. The second members are connected to the fan drive gear system module.

In a further embodiment of any of the above, the first and second members respectively include first and second brackets. The first brackets are secured to the on-wing portion of the gas turbine engine by a first set of fasteners. The second brackets are secured to the fan drive gear system module by second set of fasteners.

In a further embodiment of any of the above, the first brackets are secured to an inner diameter shroud of an inlet guide vane assembly.

In a further embodiment of any of the above, the inner diameter shroud includes first and second portions arranged about bearing members of variable inlet guide vanes. The first set of fasteners secure the first bracket and the first and second portions to one another.

In a further embodiment of any of the above, the fan drive gear system module includes a fan intermediate case that has an inlet and aft struts and a center body support to which a bearing is mounted. The second brackets are secured to the fan intermediate case and the center body support.

In a further embodiment of any of the above, the first and second members include complementary shaped mating contoured surfaces configured to align the fan drive gear system module with respect to structure of the gas turbine engine.

In a further embodiment of any of the above, the contoured surfaces are chevron-shaped.

In a further embodiment of any of the above, the fasteners extend through the contoured surfaces.

In another exemplary embodiment, a gas turbine engine has a fan that includes a plurality of fan blades rotatable about an axis. An on-wing portion includes a compressor section. A combustor is in fluid communication with the compressor section. A turbine section is in fluid communication with the combustor. A fan drive gear system module is coupled to the turbine section for rotating the fan about the axis. A connector assembly includes first and second members respectively secured to the on-wing portion and the fan drive gear system module. The first and second members are removably secured to one another by radially extending fasteners.

In a further embodiment of any of the above, a core flow path is arranged within a core nacelle. The fan is arranged upstream from the core flow path. The fasteners are accessible through the bypass flow path.

In a further embodiment of any of the above, the fasteners are captured within the fan drive gear system module to prevent the fasteners from entering the core flow path.

In a further embodiment of any of the above, the first members are secured to an inner diameter shroud of an inlet guide vane assembly of the compressor section. The inner diameter shroud includes first and second portions arranged about bearing members of variable inlet guide vanes. A first set of fasteners secures the first member and the first and second portions to one another.

In a further embodiment of any of the above, the first and second members include complementary shaped mating contoured surfaces configured to align the fan drive gear system module with respect to the on-wing portion. The fasteners extend through the contoured surfaces.

In a further embodiment of any of the above, a fan section is removed from an on-wing portion of a gas turbine engine to expose a bypass flow path. Fasteners are manipulated through the bypass flow path to separate a fan drive gear system module from the on-wing portion.

In a further embodiment of any of the above, the removing step includes removing a nose cone from a fan hub, and removing a fan nut from the fan drive gear system module.

In a further embodiment of any of the above, the step of removing a shaft nut from a shaft to separate the fan drive gear system module from the on-wing portion.

In a further embodiment of any of the above, the manipulating step includes loosening the fasteners to detach the fan drive gear system module from an inlet guide vane inner shroud diameter.

BRIEF DESCRIPTION OF THE DRAWINGS

The disclosure can be further understood by reference to the following detailed description when considered in connection with the accompanying drawings wherein.

DETAILED DESCRIPTION

Figure 1:
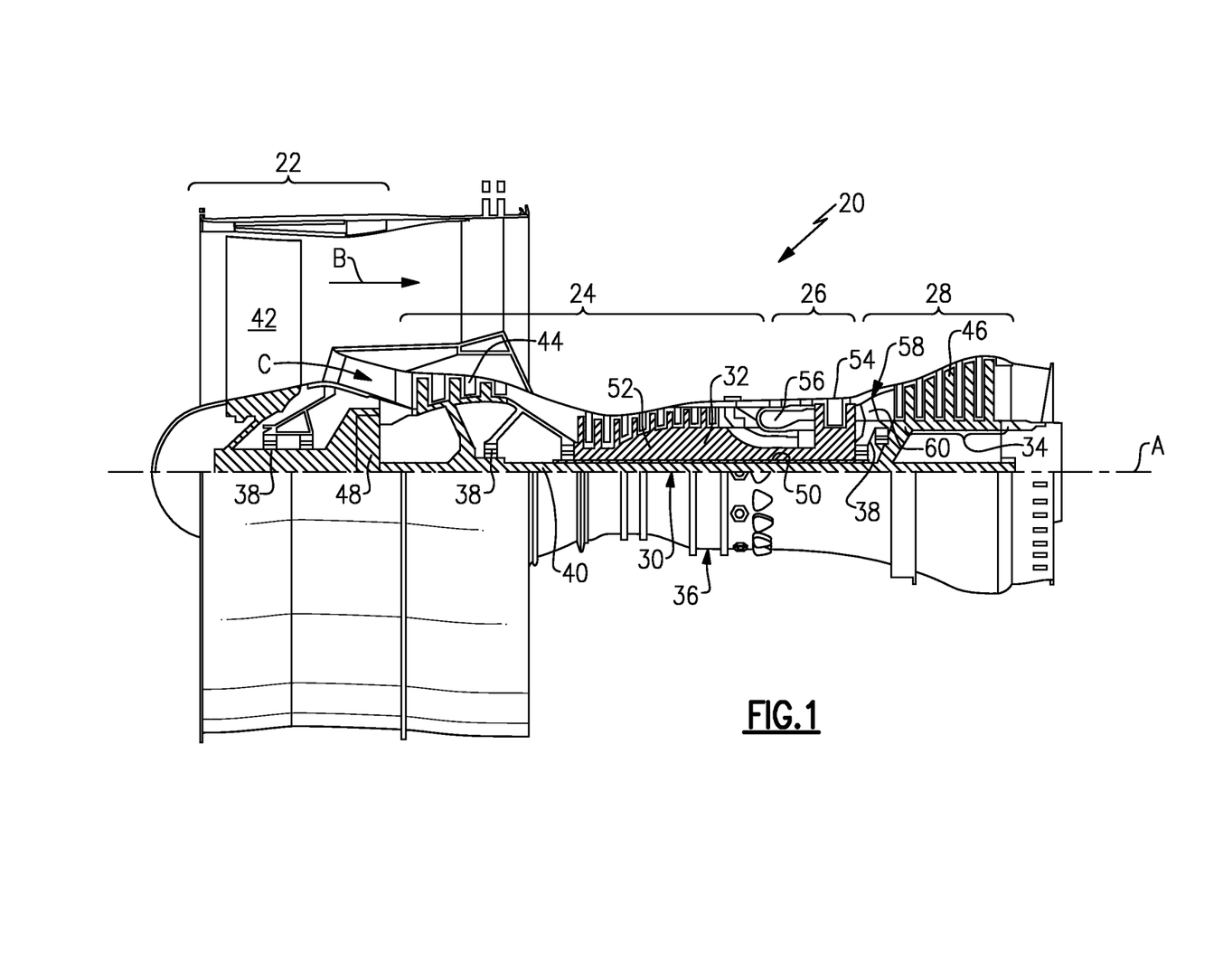
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan blades 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of fan blades 42 in the fan section 22 disclose an example gas turbine engine 20 with increased power transfer efficiency.

Bearing and gear serviceability inspection requires removal of the fan drive gear system (FDGS) Assembly. This inspection typically requires four weeks off the aircraft. The disclosed forward engine components include features for simplifying and accommodating this inspection. Assembly component modifications uniquely meet this serviceability requirement.

Figure 2:
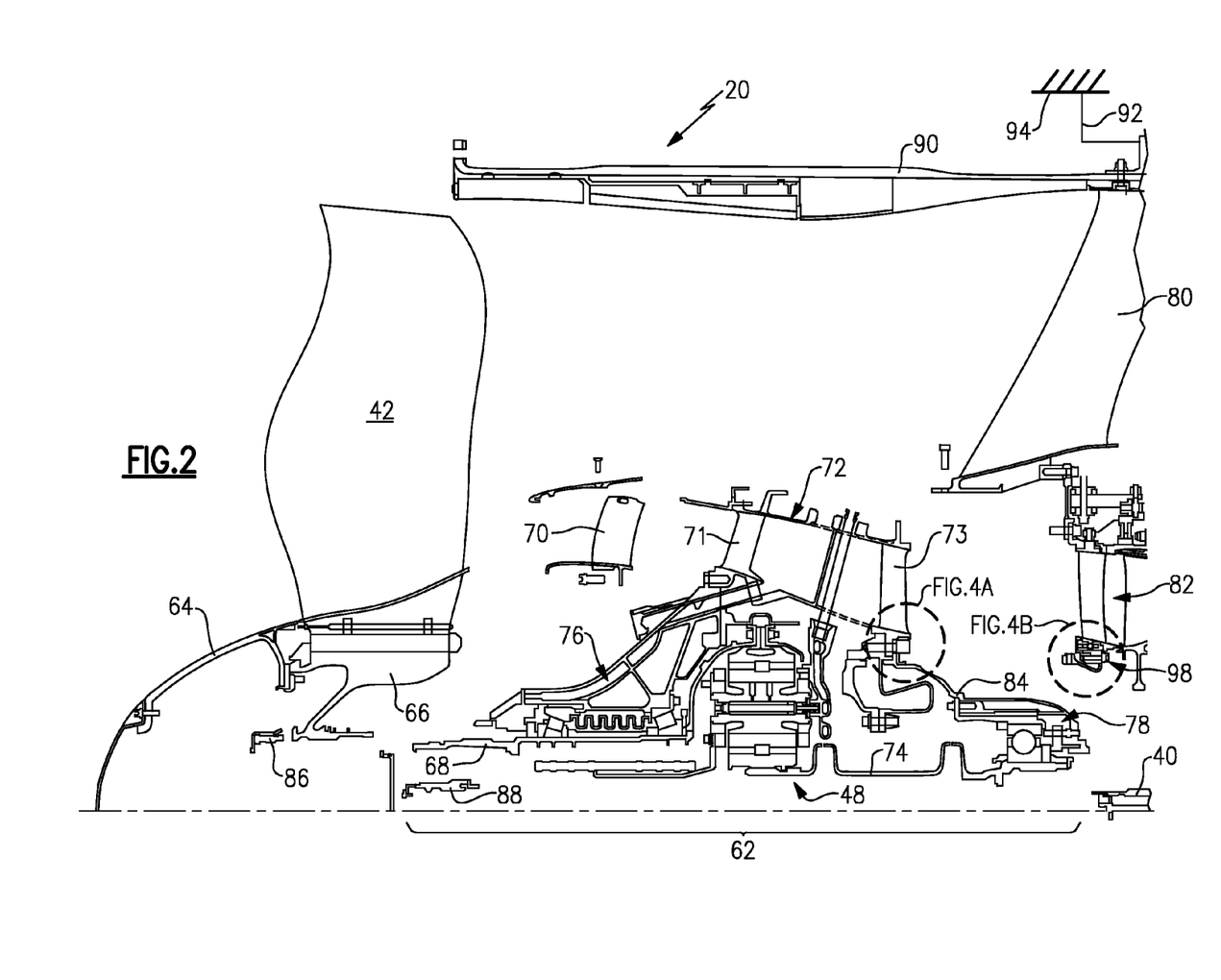
FIG. 2 is an exploded view of a forward portion of the gas turbine engine shown in FIG. 1, including a geared architecture and a fan section.

Referring to FIG. 2, the disassembly of the geared architecture 48 is schematically depicted in an exploded view. The disassembly permits removal of a fan drive gear system module 62 of the geared architecture 48 with the remainder of the gas turbine engine 20 remaining on-wing. "On-wing" does not necessarily require the engine 20 to be mounted on the aircraft, but means the portion of the engine including the compressor, combustor and turbine sections 24, 26 and 28.

The geared architecture 48 includes a fan drive gear system module 62 that is removable as an assembly. During the disassembly procedure, a nose cone 64 is removed from a fan hub 66, which supports the fan blades 42. With the nose cone 64 removed, a fan hub nut 86 can be unthreaded from a fan shaft 68 to remove the fan hub 66 and fan blades 42. A fan exit stator 70 is removed from a fan intermediate case 72. A shaft nut 88 is unthreaded from the inner shaft 40 permitting the input coupling 74 along with the fan drive gear system module 62 to be detached from the inner shaft 40.

The fan drive gear system module 62 includes a number one bearing 76 supporting the fan shaft 68 relative to the fan intermediate case 72. A number two bearing 78 is arranged between a center body support 84 of the fan drive gear system module 62 and the input coupling 74.

The fan intermediate case 72 includes inlet struts 71 and aft struts 73 arranged rearward of the inlet struts 71 which are arranged in the core flow path. The fan intermediate case 72 is supported relative to a fan case 90 by flow exit guide vanes 80. The engine 20 is supported relative to an aircraft 94 by a pylon 92.

In the example, the fan drive gear system module 62 generally includes the fan intermediate case 72, center body support 84, number one and two bearings 76, 78, fan shaft 68, input coupling 74 and gear train.

Before the fan intermediate case 72 can be separated from the inner shaft 40, disassembly of the fan intermediate case 72 occurs at a connection assembly 96, which removably secures an inlet guide vane assembly 82 relative to the fan intermediate case. In particular, an inner diameter shroud 98 of the inlet guide vane assembly 82 is detached from the fan intermediate case 72 in the area of the aft struts 73. In the example, the inlet guide vane assembly vanes are variable in that individual guide vanes rotate about a radial axis.

Figure 3:
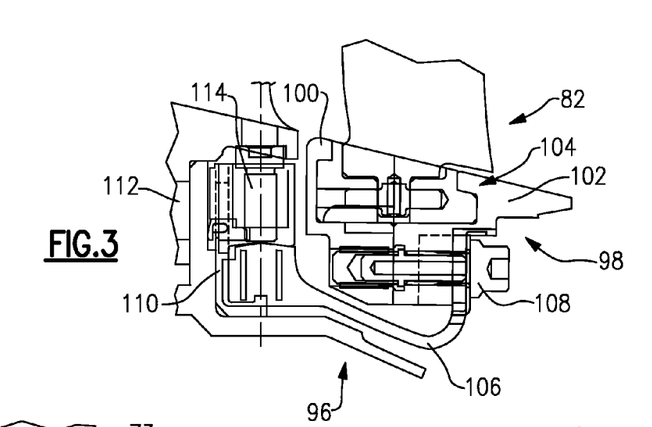
FIG. 3 is a cross-sectional view of a portion of the gas turbine engine shown in FIG. 2, relating to a connection assembly including an inlet guide vane assembly.
Figure 4A:
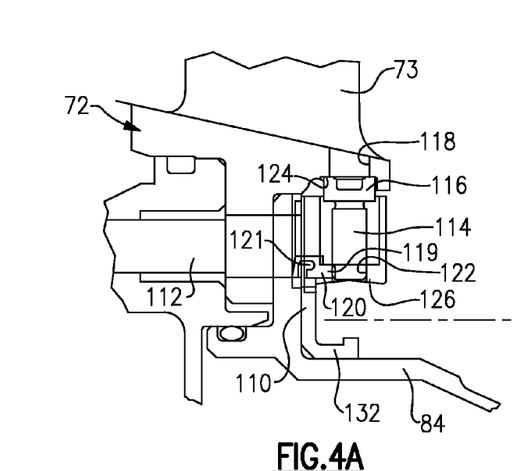
FIG. 4A illustrates a first member of the connection assembly.
Figure 4B:
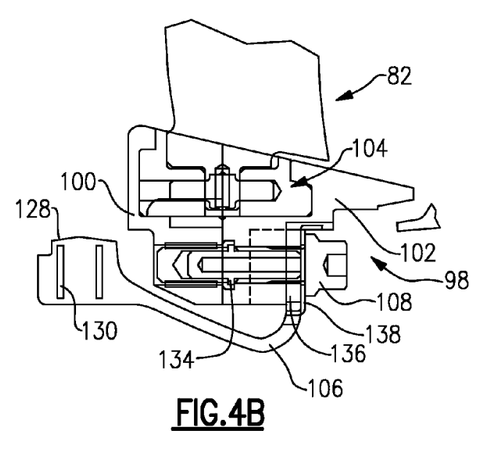
FIG. 4B illustrates a second member of the connection assembly.

The connection assembly 96 is shown in more detail in FIGS. 3, 4A and 4B. First and second members are removably secured to one another by radially extending fasteners to decouple the fan drive gear system module 62.

The inner diameter shroud 98 includes first and second portions 100, 102 secured to one another by a first fastener 108 that is oriented in an axial direction in the example. A bearing member 104 is retained between the first and second portions 100, 102 that is used to specifically support the inlet guide vanes. A first bracket 106 is also secured at the inner diameter shroud 98 by the first fastener 108.

A second bracket 110 is supported by the fan intermediate case 72. In one example, the bracket 110 is secured to the center body support 84 and structure providing the aft struts 73 by second fasteners 112, which are oriented in an axial direction in the example shown.

Third fasteners 114 are supported by the second bracket 110 and secure the first bracket 106 to the second bracket 110. In the example, the third fasteners 114 are oriented in a radial direction, which permits access through the core flow path to the connection assembly 96 during disassembly of the fan drive gear system module 62.

A head 116 of the third fastener 114 is larger than an access hole 118 that is configured to enable a tool to be inserted through the access hole 118 to manipulate the third fasteners 114. The third fastener 114 is sized such that when the third fastener 114 is disengaged from the first bracket 106, the head 116 abuts a stop surface 124 of the fan intermediate case 72 to prevent complete removal and accidental loss of the third fasteners 114. The second bracket 110 also includes a threaded hole 122 that may be provided by a helicoil, which retains the third fastener 114 in the disengaged position shown in FIG. 4A. A radial lock 120, which may be constructed from plastic, engages the threads of the third fastener 114 to provide a slight clamping load to the threads of the third fastener 114 during assembly and disassembly. The radial lock 120 includes a lever portion 119 that exerts a biasing force against the fastener to maintain it in the desired radially outward position. The example lever portion 119 comprises a polyimide spring ratcheting material with RTV filler 121 that prevents fracture and aids in maintaining the desired contact with the radially extending fastener.

The second and first brackets 110, 106 respectively include first and second contoured surfaces 126, 128 that are of a complimentary shape to one another. The complimentary shaped first and second contoured surfaces 126, 128, which are chevron shapes in the example, ensure desired alignment of the first and second brackets 106, 110 with respect to one another during assembly as the third fasteners 114 are tightened.

In this example, four second brackets 110 are shown disposed about an inner circumference of the aft struts 73. As appreciated, other numbers of bracket assemblies could be utilized as is required to provide the desired mounting and support for the fan drive gear system. Each of the brackets includes a structural cross member to attach the brackets such that the number of individual separate parts is limited.

Referring to FIG. 4B, the first fasteners 108 each include a capture feature 134, which ensures that the first fasteners 108 are retained with respect to the second portion 102. A washer 136 and tab washer 138 are arranged beneath a head of the first fasteners 108 in the example.

Figure 5:
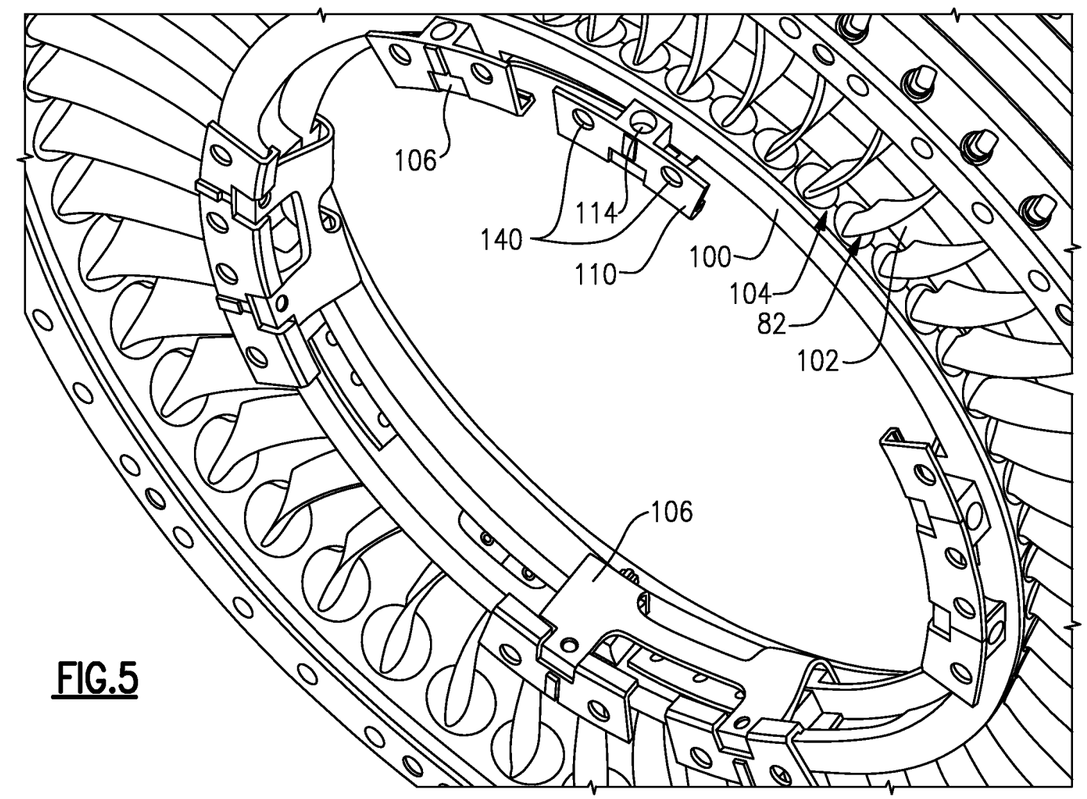
FIG. 5 is a perspective view of the connection assembly shown in FIG. 3.

Referring to FIG. 5, the apertures 140 in the second brackets 110 are shown. The second fasteners 112, shown in FIG. 4A, are inserted through the apertures 140 in an assembled condition.

Figure 6:
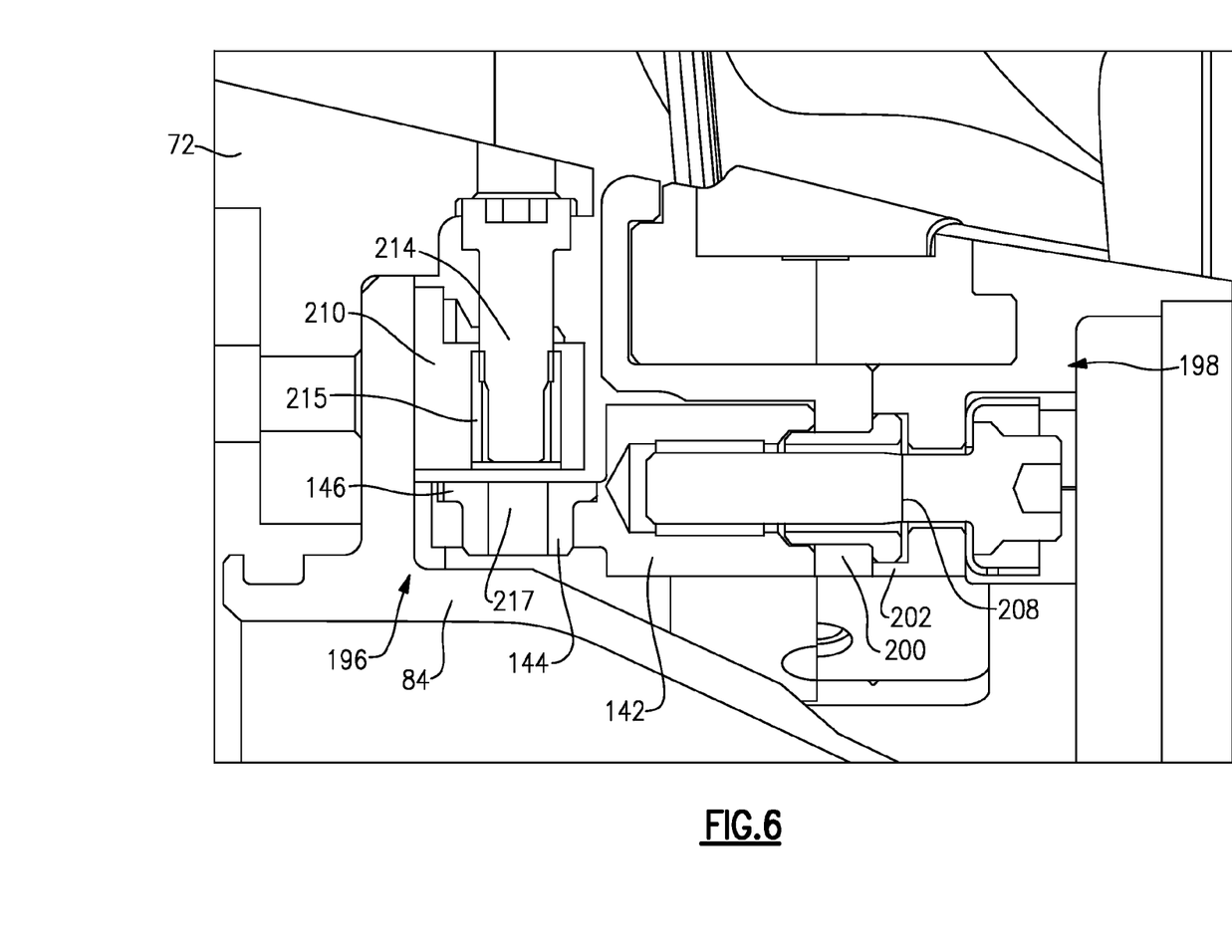
FIG. 6 is a cross-sectional view of another example connection assembly.
Figure 7A:
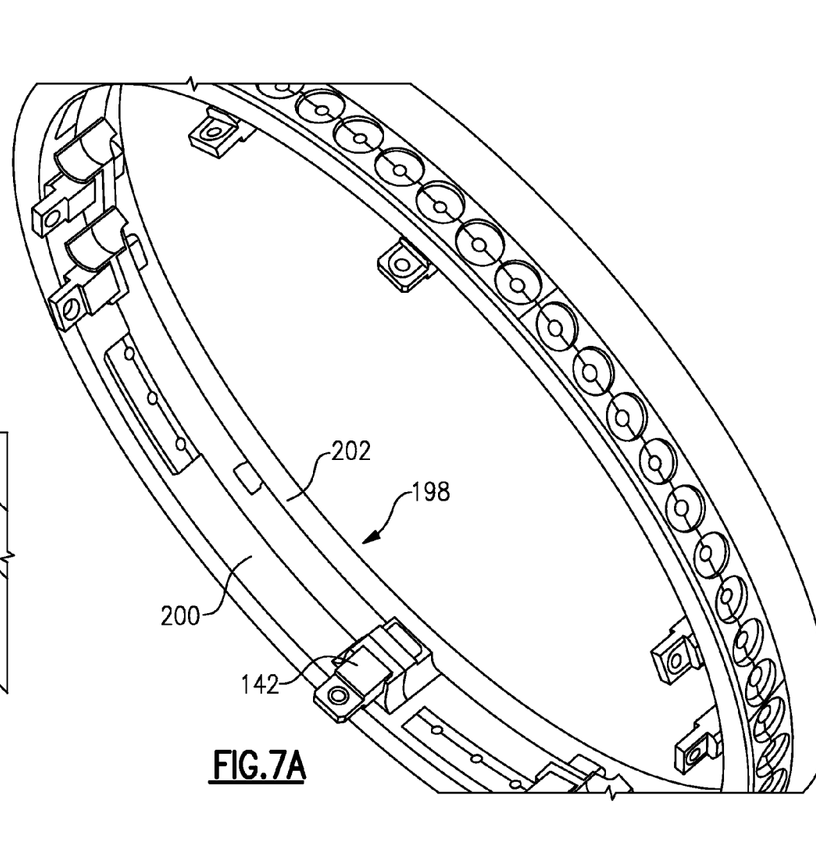
FIG. 7A is a perspective view of the connection assembly shown in FIG. 6.

Another example connection assembly 196 is shown in FIGS. 6 and 7A. In this example, the first bracket 142 is secured on a forward side of the first portion 200, which is arranged between the first bracket 142 and the second portion 202. The first fastener 208 secures the first bracket 142 and the first and second portions 200, 202 of the inner diameter shroud 198 to one another.

Figure 7B:
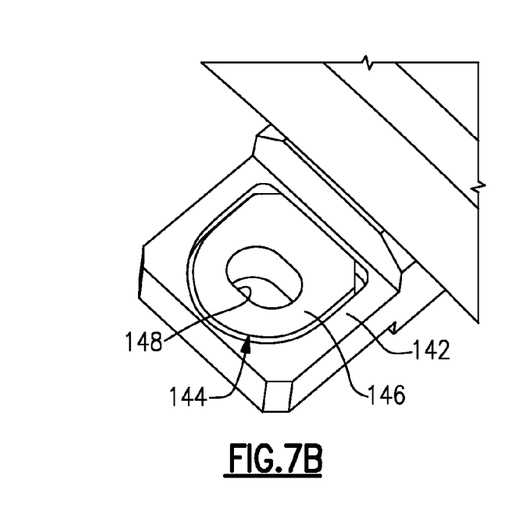
FIG. 7B is an enlarged perspective view of a bracket of the connection assembly shown in FIG. 7A.

The first bracket 142 carries a nut 144 having a flange 146. The bushing 144 provides an elongated opening 148, as shown in FIG. 7B. Returning to FIG. 6, the second bracket 210 carries the third fastener 214 which is removably secured with respect to the bushing 144.

The radially extending fasteners 214 include a length with partial threads. An end of each fastener 214 is smooth and defines a pin 217 that is received within the bushing 144 inserted near the fastener such that upon threading the fastener 214 through a helicoil 215 in the second bracket 210, the pin 217 of the fastener 214 will engage the bushing 144 supported and thereby provide a non-threaded connection. In this way, the need is eliminated for the threaded alignment between the mated parts of the connection assembly 96.

Figure 8:
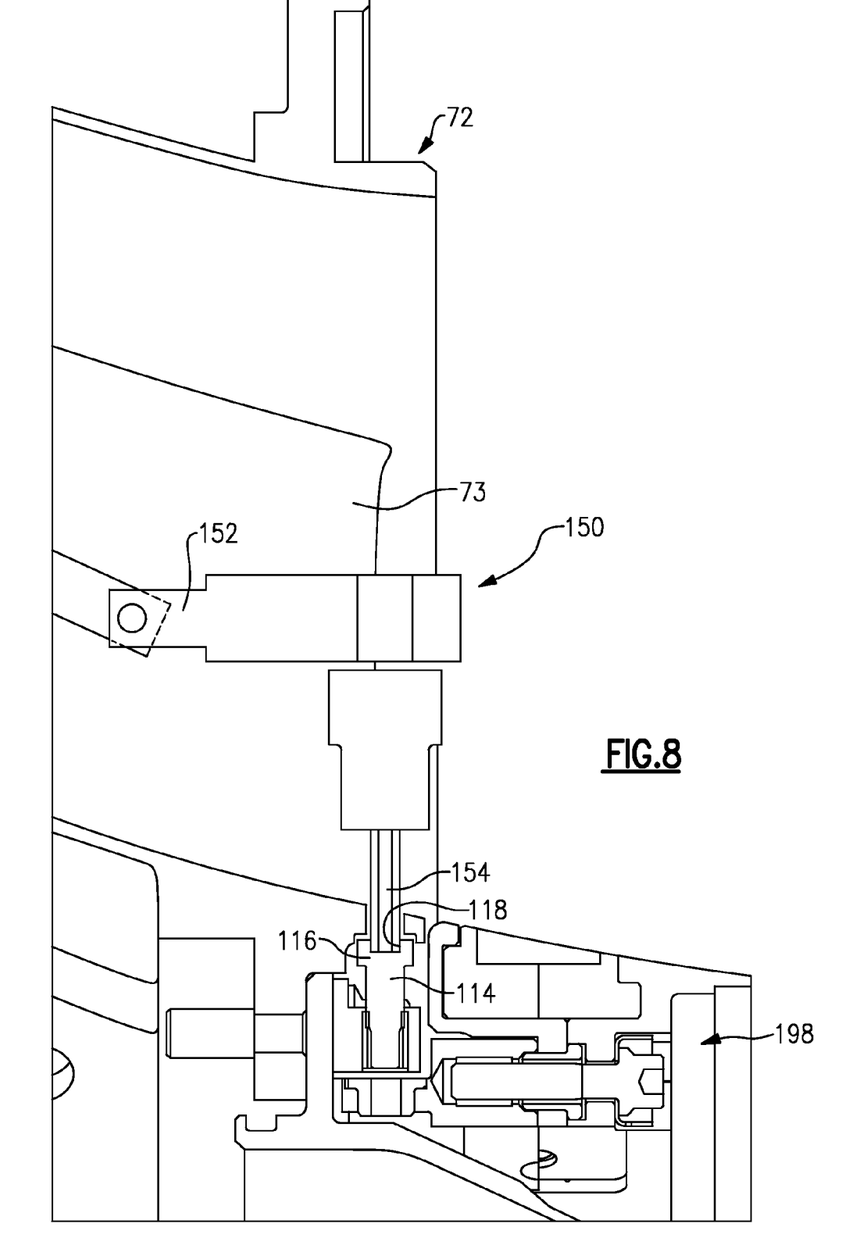
FIG. 8 is a cross-sectional view depicting a fan drive gear system module removal procedure in which the connection assembly is disassembled.

A tool 150 used during an example removal procedure is shown in FIG. 8. The tool 150 is a ratchet wrench 152 arranged within the core flow path of the fan intermediate case 72 circumferentially between the aft struts 73. The ratchet wrench 152 drives a socket head tool 154, which may have an allen, torx, ribe or other profile to drive the head 116 of the third fastener 114.

Accordingly, the example connector assembly provides for access and unfastening of the fan drive gear system through a forward portion of the engine. Openings within the flow path allow access for a tool to a radially extending fastener to decouple and remove the fan drive gear system during maintenance and other inspection operations.

Although an example embodiment has been disclosed, a worker of ordinary skill in this art would recognize that certain modifications would come within the scope of this disclosure.

What is claimed is:

1. A connection assembly for securing a fan drive gear system module within a gas turbine engine comprising:
   first and second members removably secured to one another by radially extending fasteners, wherein the first members are connected to an on-wing portion of the gas turbine engine, and the second members are connected to the fan drive gear system module, wherein the first and second members respectively include first and second brackets, the first brackets are secured to the on-wing portion of the gas turbine engine by a first set of fasteners, and the second brackets are secured to the fan drive gear system module by second set of fasteners.

2. The connection assembly according to claim 1, wherein the first brackets are secured to an inner diameter shroud of an inlet guide vane assembly.

3. The connection assembly according to claim 2, wherein the inner diameter shroud includes first and second portions arranged about bearing members of variable inlet guide vanes, the first set of fasteners securing the first bracket and the first and second portions to one another.

4. The connection assembly according to claim 1, wherein the fan drive gear system module includes a fan intermediate case having inlet and aft struts and a center body support to which a bearing is mounted, the second brackets secured to the fan intermediate case and the center body support.

5. A gas turbine engine comprising:
   a fan including a plurality of fan blades rotatable about an axis;
   an on-wing portion including:
     a compressor section;
     a combustor in fluid communication with the compressor section;
     a turbine section in fluid communication with the combustor;
   a core flow path arranged within a core nacelle, the fan arranged upstream from the core flow path;
   a fan drive gear system module coupled to the turbine section for rotating the fan about the axis; and
   a connector assembly including first and second members respectively secured to the on-wing portion and the fan drive gear system module, the first and second members removably secured to one another by radially extending fasteners, wherein the first members are connected to an on-wing portion of the gas turbine engine, and the second members are connected to the fan drive gear system module, wherein the radially extending fasteners are accessible through the bypass flow path, wherein the first and second members respectively include first and second brackets, the first brackets are secured to the on-wing portion of the gas turbine engine by a first set of fasteners, and the second brackets are secured to the fan drive gear system module by second set of fasteners.

6. The gas turbine engine according to claim 5, wherein the radially extending fasteners are captured within the fan drive gear system module to prevent the radially extending fasteners from entering the core flow path.

7. The gas turbine engine according to claim 5, wherein the first members are secured to an inner diameter shroud of an inlet guide vane assembly of the compressor section, the inner diameter shroud includes first and second portions arranged about bearing members of variable inlet guide vanes, the first set of fasteners securing the first member and the first and second portions to one another.

8. The gas turbine engine according to claim 5, wherein the first and second members include complementary shaped mating contoured surfaces configured to align the fan drive gear system module with respect to the on-wing portion, the radially extending fasteners extend through the contoured surfaces.

9. The gas turbine engine according to claim 8, wherein the contoured surfaces are chevron-shaped.

10. The gas turbine engine according to claim 9, wherein the fasteners extend through the contoured surfaces.

11. The gas turbine engine according to claim 5, wherein the first brackets are secured to an inner diameter shroud of an inlet guide vane assembly.

12. The gas turbine engine according to claim 11, wherein the inner diameter shroud includes first and second portions arranged about bearing members of variable inlet guide vanes, the first set of fasteners securing the first bracket and the first and second portions to one another.

13. The gas turbine engine according to claim 5, wherein the fan drive gear system module includes a fan intermediate case having inlet and aft struts and a center body support to which a bearing is mounted, the second brackets secured to the fan intermediate case and the center body support.

\* \* \* \* \*